United States Patent [19]
Gladish

[11] Patent Number: 5,100,327
[45] Date of Patent: Mar. 31, 1992

[54] METHOD AND APPARATUS FOR TEACHING VEHICLE SAFETY

[76] Inventor: William C. Gladish, 3506 Latana Way, Beale AFB, Calif. 95903

[21] Appl. No.: 636,210

[22] Filed: Dec. 31, 1990

[51] Int. Cl.⁵ .............................................. G09B 25/00
[52] U.S. Cl. ..................................... 434/305; 280/801
[58] Field of Search ............... 434/274, 305, 365, 267; 446/462, 484, 279, 268; 280/801, 808; 273/272

[56] References Cited
U.S. PATENT DOCUMENTS

| | | |
|---|---|---|
| 2,159,088 | 5/1973 | Fortenbacher . |
| 3,409,841 | 8/1985 | Nissalk . |
| 3,557,471 | 1/1971 | Payne .............................. 434/274 |
| 4,488,375 | 12/1984 | Cheng . |
| 4,562,893 | 1/1986 | Cunard . |
| 4,575,355 | 3/1986 | Lee et al. . |
| 4,580,985 | 4/1986 | Redenbaugh ....................... 434/365 |
| 4,731,026 | 3/1988 | Fenton . |
| 4,815,607 | 3/1989 | Agapiou . |
| 4,895,542 | 1/1990 | de Blanitza . |

Primary Examiner—Richard J. Apley
Assistant Examiner—Glenn E. Richman
Attorney, Agent, or Firm—James M. Ritchey

[57] ABSTRACT

For aiding in educating children concerning vehicle safety, an instructional toy vehicle and method of use are disclosed. The toy vehicle is equipped with a functioning shoulder strap seat belt. Included is a crash dummy and instructional manual describing safety exercises that illustrate the use of a seat belt and the results of not wearing such a restraining device.

11 Claims, 4 Drawing Sheets

METHOD AND APPARATUS FOR TEACHING VEHICLE SAFETY

BACKGROUND OF THE INVENTION

1. Field of the Invention

An educational toy and method of conveying vehicle safety procedures is presented. More specifically, vehicles are disclosed with operational safety belt restraining devices, removable toy passenger figures or crash dummies, an instructional manual, and associated safety articles.

2. Description of the Background Art

Visual and physical aids help impart subject matter to individuals seeking to learn a particular topic. The key is to find a suitable combination of instructional elements that benefits the user with regard to the concept being studied. Various aspects of vehicle safety have been conveyed to children by differing methods and devices over the years. None of the prior attempts to transmit vehicle safety to children uses a vehicle having a working seat belt and a crash figure or dummy in directed, realistic demonstrations of the need for a passenger to be secured by a seat belt.

Disclosed in U.S. Pat. No. 4,488,375 is a typical toy vehicle. This particular toy vehicle has a body pivotably attached to the frame. Shown in this patent is a driving dummy wearing a nonfunctional seat belt. No mention is made of the significance of the dummy or the seat belt.

A child's ride-on toy vehicle is presented in U.S. Pat. No. 4,562,893. Safety features built into the design include front and rear roll bars.

U.S. Pat. No. 4,575,355 teaches a toy vehicle having a waist encircling seat belt (not a shoulder harness type seat belt) constructed of two rigid semicircles with each directly incorporated into the drive mechanism of the vehicle. The seat belt must be in the closed position for the vehicle to move under its own force.

A method and apparatus for teaching school bus safety to children is described in U.S. Pat. No. 4,731,026. Comprising the system is a movable school bus, a child figure, a movable car, and a flat sheet having various zones of danger displayed upon its exposed viewing surface.

A safety awareness kit, including toy figures and storage case, is related in U.S. Pat. No. 4,815,607. The toy figure, say a cat or squirrel, has a flattened portion that shows the result of improperly encountering a vehicle.

U.S. Pat. No. 4,895,542 reports a toy automobile with attachments. Included in the attachments are the various items that would be fitted to a truck type vehicle, including: a window; a roof; multiple headlights; an antenna; and similar articles.

German Patent No. 3,409,841 discloses an instructional model for teaching children the operation of traffic lights. The described device resembles a traffic light.

Likewise, in German Patent No. 2,159,088, road safety procedures are conveyed to children.

SUMMARY OF THE INVENTION

An object of the present invention is to present an instructional vehicle toy for training children about general vehicle safety.

A further object of the present invention is to relate a training method that conveys general safety principles relating to vehicles.

An additional object of the present invention is to create a child's toy that physically illustrates the effect of not wearing a seat belt on dummies placed within a vehicle that crashes.

Another object of the present invention is to produce a method of instructing a child in the beneficial aspects of using seat belts by providing a crash dummy, a vehicle with functional seat belts, and an instructional manual that outlines various experiments or safety exercises that the child practices to establish the results of wearing or not wearing a properly fastened seat belt in a vehicle.

Yet a further object of the present invention is to originate a method of seat belt safety instruction that is adaptable to any means of transportation.

The subject device, an instructional apparatus for teaching vehicle seat belt safety to a child, comprises a three-dimensional passenger figure for fitting into the seat of a vehicle. The vehicle is a movable three-dimensional vehicle having a passenger (a driver or rider) seat fitted with a seat belt restraining device. The seat belt is reversibly securable about the passenger figure. When the seat belt is secured about the passenger figure the passenger figure is restrained from a vehicle crash related removal from the passenger seat. Preferably, a manual is included that presents safety exercises for the child that illustrate the proper use of the seat belt and the results to the passenger figure of not securing the seat belt.

Other objects, advantages, and novel features of the present invention will become apparent from the detailed description that follows, when considered in conjunction with the associated drawings.

BRIEF DESCRIPTION OF THE DRAWINGS

FIG. 1a is a perspective view of one embodiment of the subject device including a land vehicle, a ramp, and a barrier object.

DESCRIPTION OF THE PREFERRED EMBODIMENT

Referring now to FIGS. 1-6, there are shown preferred embodiments of an apparatus for teaching vehicle safety. Models and sample practices are provided, both to add a measure of fun to the learning process and to stimulate the desire to learn more. Generally, vehicle safety involving the use of a seat belt is related. Specifically, disclosed is an instructional apparatus for teaching vehicle seat belt safety to a child that comprises a three-dimensional passenger figure, usually flexibly jointed, and a movable three-dimensional vehicle, generally a land vehicle or an air vehicle. Within the vehicle is a passenger seat fitted with a seat belt restraining device. When the passenger figure is fitted in the passenger seat and the seat belt is reversibly securable about the passenger figure, the passenger figure is restrained from a vehicle crash related removal from the passenger seat.

Further comprising the subject apparatus is an instructional manual that presents safety exercises for a user. The exercises illustrate the use of the seat belt and the results to the passenger figure of not securing the seat belt.

Additionally, for a land vehicle, a detachable roll bar, a barrier object into which the vehicle is be crashed, and a ramp from which the vehicle is launched are provided. These items help to illustrate the results to the passenger figure of not wearing a seat belt.

Preferably, the subject apparatus comprises a movable three-dimensional toy or model vehicle that is either a land vehicle 3a (see FIGS. 1a, 1b, 3a, 3b, and 4) that usually travels over a supporting surface or an air vehicle 3b (see FIG. 5) that usually travels through the air. Since the subject device is an instructional toy, the size of the vehicle is usually not greater than about three feet in length, but may exceed this size if desired. Each vehicle may or may not contain a propulsion system such as a spring mechanism, an electric motor, a gasoline engine, and the like and may include means for controlling remotely the actions of the vehicle. The vehicle may be constructed from standard components including metals, natural and synthetic polymers, wood, and equivalent materials.

Figure 1B:
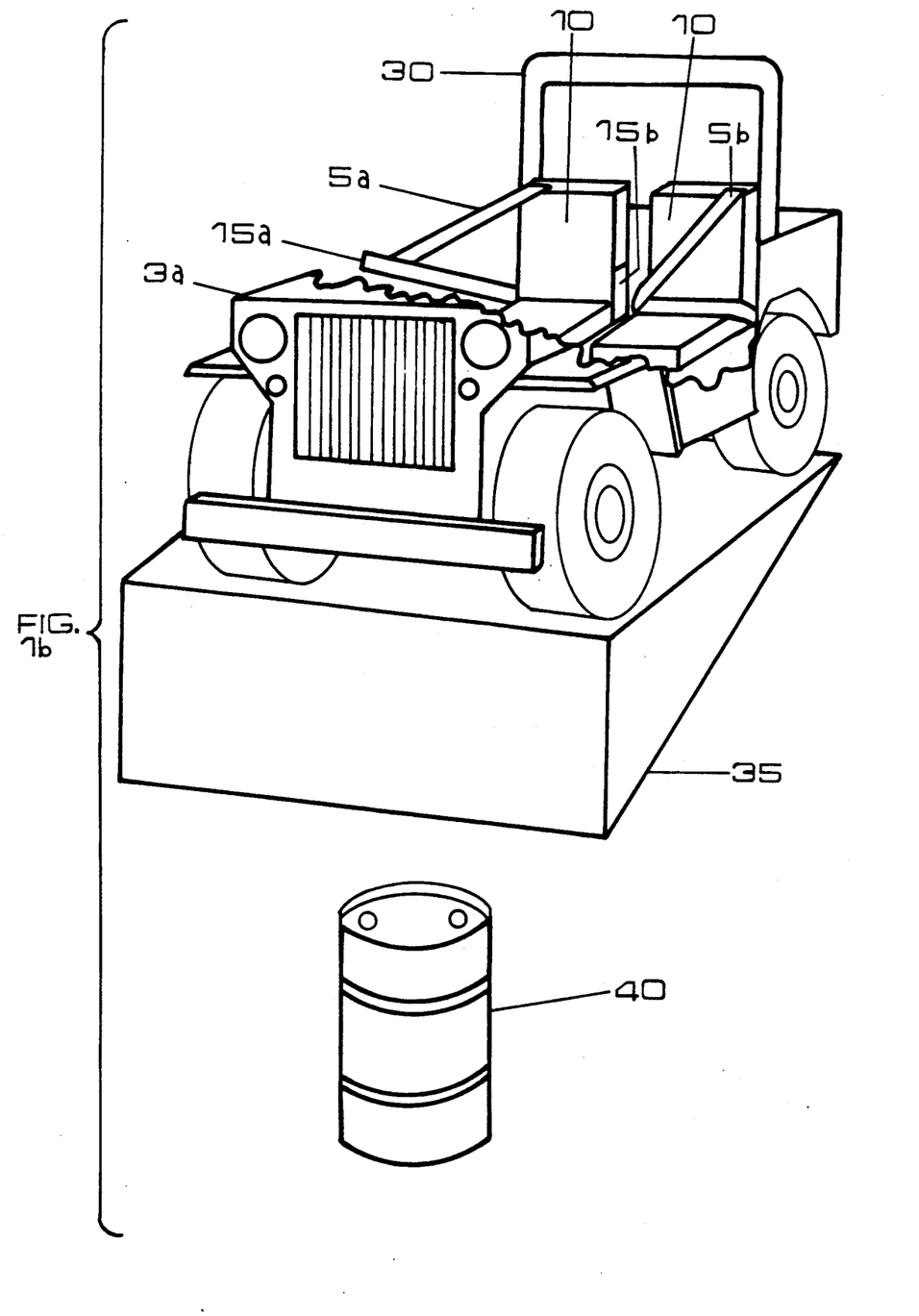
FIG. 1b is the perspective view shown is FIG. 1a, but the vehicle is illustrated in cutaway to show fully the seat belts.

FIGS. 1a and 1b clearly illustrate a land vehicle 3a. There is no requirement that the vehicle 3a be a JEEP® type vehicle as shown, but may be of any design configuration. Fitted to the vehicle is a seat belt or seat belt restraining device that is unfastened 5a or fastened 5b. Each seat belt is anchored to one side of a passenger seat 10, wherein each passenger seat 10 is secured within the vehicle. As is seen in FIG. 1b, an unfastened seat belt has a first coupler half 15a that is capable of being reversibly secured or mated by a user to a seat 10 associated second coupler half 15b to form a fastened seat belt 5b. Preferably, the coupler halves (15a and 15b) have coupling means that are easily mated to and detached from one another, yet provide enough resistance to unfastening to firmly secure a passenger FIG. 20 between a fastened seat belt 5b and a seat 10. Usual coupling means include, but are not limited to, VELCRO® (hook-to-mat type linking surfaces), snaps, hooks, and magnets. Therefore, a preferred reversibly securable seat belt comprises a seat belt fabricated from a suitable material such as natural or synthetic polymers, leather, and similar materials and a mating pair of VELCRO® strips with one mate attached to the seat belt 15a and the other mate attached near (on the vehicle) or to the seat 10.

Each seat belt restraining device may further comprise not only a lap strap but also a shoulder strap. Since it is well known that seat belts with shoulder straps are safer than seat belts without shoulder straps, all of the seat belts shown in the figures include the shoulder strap, but the subject apparatus will function with only the lap belt.

Figure 2:
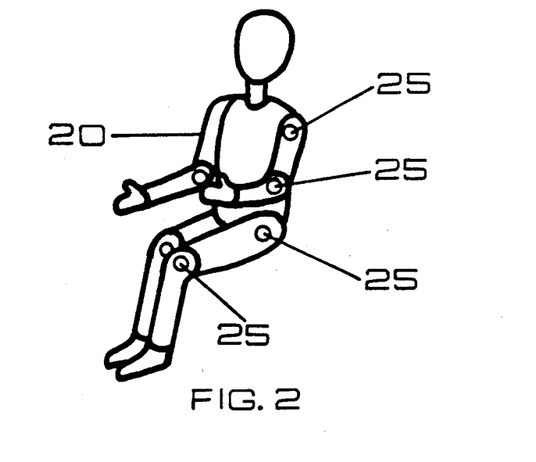
FIG. 2 is a flexibly jointed passenger figure.

A seat 10 is sized to accommodate a passenger FIG. 20. The seat 10 is firmly anchored to the vehicle. As shown in FIG. 2, a preferred type of three-dimensional passenger figure or dummy 20 mimics a human passenger by having flexible or movable joints 25. Flexible joints 25 may be associated with head-to-toso, arm-to-torso, leg-to-torso, hand-to-arm, foot-to-leg, upper leg-to-lower leg, upper arm-to-lower arm, and similar body member connection points. By having movable joints 25, a passenger FIG. 20 is fitted easily into a seat 10. Further, by having movable joints 25, a user of the subject apparatus can see the results or distortions upon the passenger FIG. 20 of being thrown from the vehicle when the figure is not wearing a fastened seat belt. For a land vehicle 3a having an unfastened seat belt 5a, FIG. 4 depicts a seated passenger FIG. 20 being ejected from the vehicle 3a, thereby becoming a removed and endangered passenger FIG. 21. When the seat belt 5b is secured or fastened about a passenger FIG. 20 (FIGS. 3a and 3b), the FIG. 20 is restrained from a vehicle crash related removal from the passenger seat 10.

To illustrate the benefits of vehicle overhead protection to a passenger, a removable or detachable roll bar 30 is disclosed. FIGS. 1a, 1b, 3a, 3b, and in particular FIG. 4 exhibit the removable roll bar 30. In practice, the roll bar 30 may be replaced with a removable roof or equivalent device for protecting a passenger FIG. 20 from injury in a crash that results in an up-side-down or tumbling vehicle.

Figure 3A:
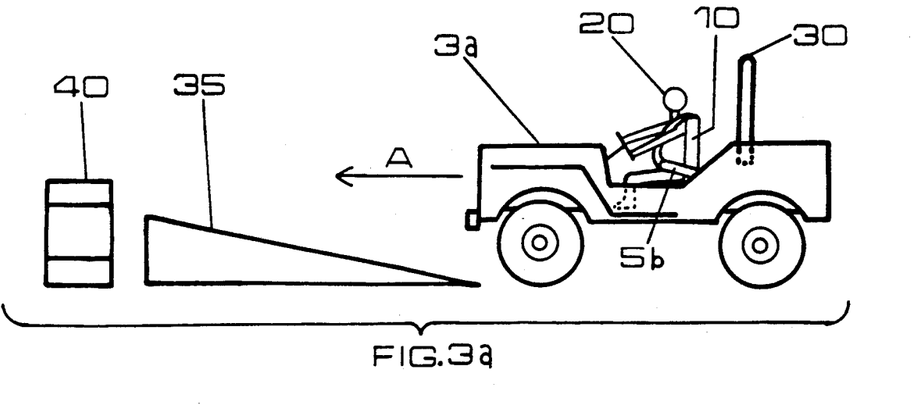
FIG. 3a is a side view of the subject device including a land vehicle, a passenger figure seat belted into the vehicle, a ramp, and a barrier object.
Figure 3B:
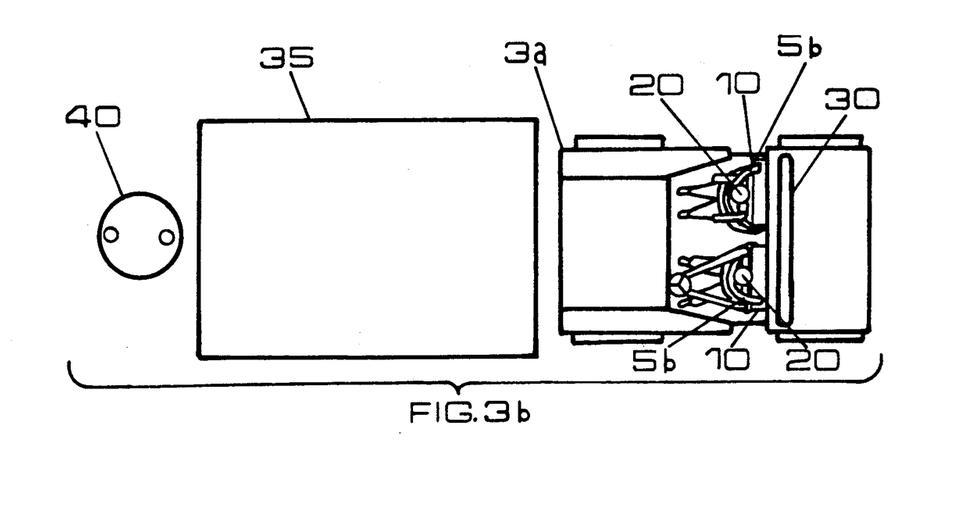
FIG. 3b is a top view of the subject device including a land vehicle, two passenger figures seat belted into the vehicle, a ramp, and a barrier object
Figure 4:
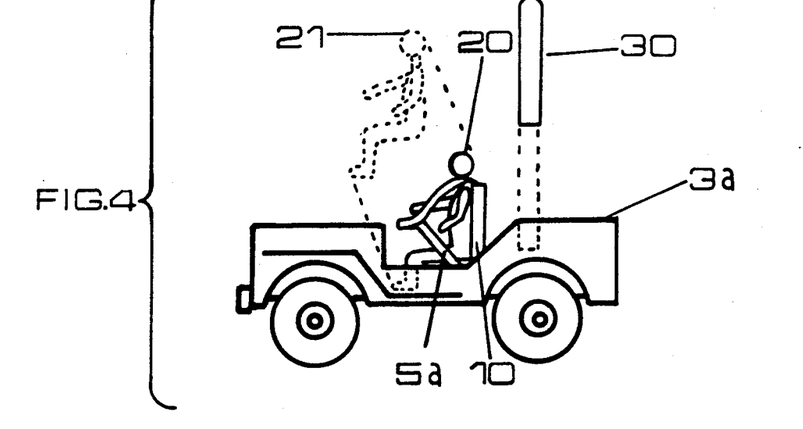
FIG. 4 is a side view of the subject land vehicle displaying an unfastened seat belt with a passenger figure seated in a vehicle seat or being removed from the vehicle (dotted lines) and a detached roll bar and its location within the vehicle (dotted lines).

Additional equipment such as a vehicle ramp 35 and barrier object 40 are disclosed in FIGS. 1a, 1b, 3a, and 3b. As depicted in FIG. 3a, the vehicle 3a traveling or being propelled in the direction indicated by arrow A would climb up the ramp 35 and given enough force be launched off or from the ramp 35. When the launched vehicle 3a hits an unmovable object (a wall or the like), the ground, or a partially movable barrier object 40 and comes to a slow or abrupt halt or tumbles, a child user sees either a seat belt secured figure staying within the vehicle or a seat belt unsecured figure most likely being ejected from the vehicle and the resulting damage to the propelled flexibly jointed passenger FIG. 20. Here, FIGS. 1a, 1b, 3a, and 3b, the barrier object 40 is shown as a barrel, but any partially movable object is contemplated as suitable. Partially movable implies that when a vehicle crashes into the barrier object 40 that some movement of the barrier object 40 results, unlike an unmovable object such as a wall. In the movement of the barrier object 40 upon a vehicle crash, some of the vehicle's forward momentum is absorbed by barrier object 40.

Figure 5:
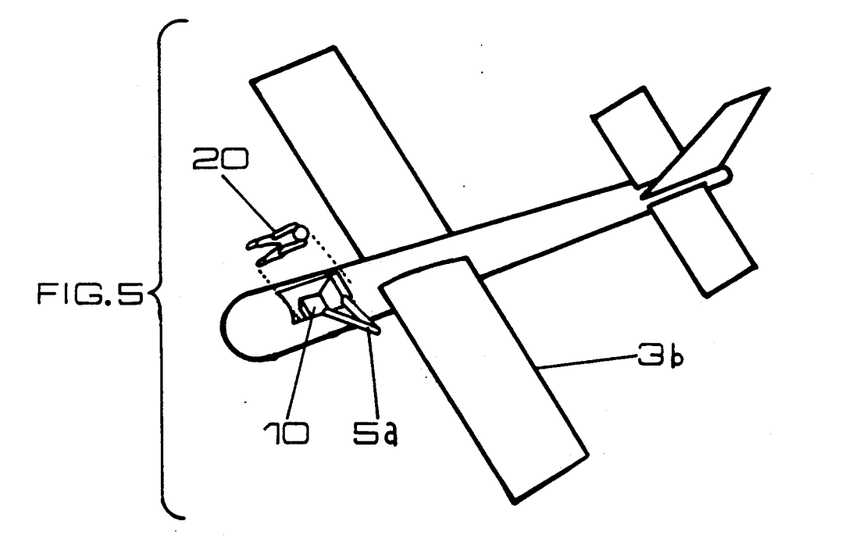
FIG. 5 is a perspective view of another embodiment of the subject invention showing an air vehicle with an unfastened seat belt and a passenger figure that is insertable into the vehicle or removable along the dotted lines.
Figure 6:
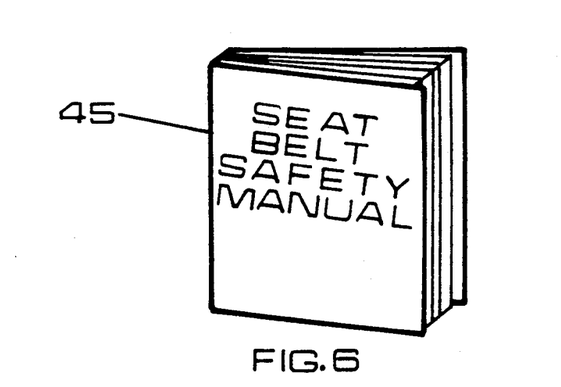
FIG. 6 is a perspective view of a Seat Belt Safety Manual of the subject device.
Figure 7A:
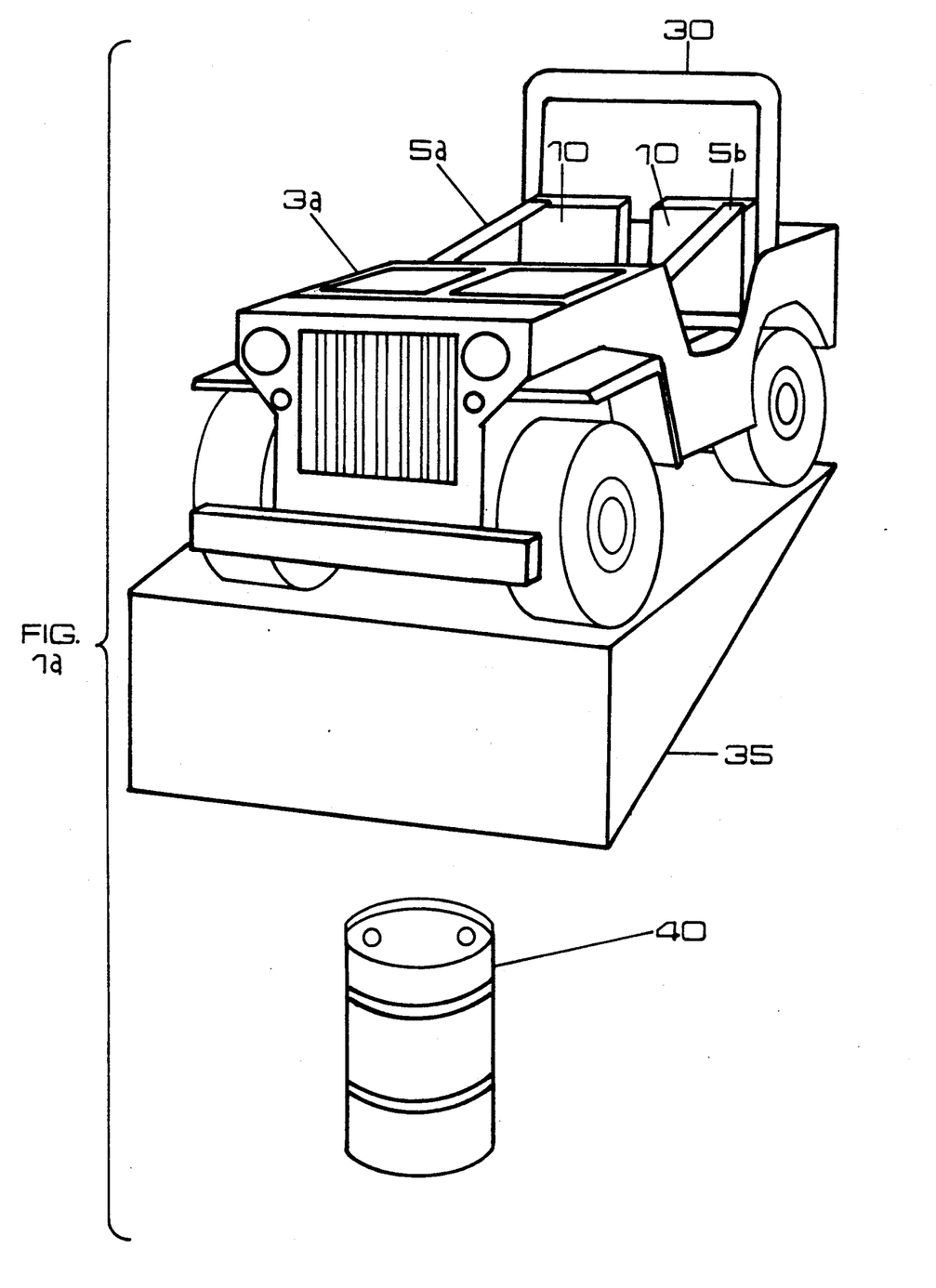

Seat belts find use with not only land vehicles 3a, but air vehicles 3b as well. FIG. 5 plainly indicates an airplane 3b (additionally, helicopters, gliders, and like devices are contemplated to be within the realm of this disclosure) having a seat 10, a seat belt 5a (unfastened seat belt in this rendition), and a passenger FIG. 20 that fits within the air vehicle. Clearly, airplane pilots and passengers require seat belt restraining devices for rough weather, bad landing, up-side-down maneuvers, and similar unusual procedures. Air vehicles having more than one seat are considered to be equivalent alternative versions to the single seat rendition depicted in FIG. 5. Such air vehicles may or may not be actual flying models, but if capable of flying, such designs may be propelled by any standard means. As with the land vehicle 3a, a readily fastenable seat belt 5a is required. Means for fastening the seat belt are equivalent with those described above for the land vehicle 3a.

Providing a user, presumably a child, with a three-dimensional passenger figure and vehicle with a functioning seat belt will permit free form or spontaneous usage of these elements by the child. Some general seat belt safety knowledge is obtained from such free form activities. However, the seat belt safety learning process is specifically enhanced by providing an instructional manual 45 (see FIG. 6). Contained within the manual 45 are exercises or experiments designed to show correct and incorrect operation of a seat belt under various vehicle crash conditions and the results to a passenger of not fastening a seat belt. Various suitable exercises can be listed concerning proper seat belt usage, however, five specific seat belt safety exercise examples are now given. It must be stressed that these exercises are for illustrative purposes only and are not to be considered exhaustive of useful seat belt safety experiments.

EXAMPLE 1

In a first procedure, a user child places a flexibly jointed passenger FIG. 20 into a land vehicle 3a. The child fastens a seat belt 5b over the passenger figure. Next the child propels the figure containing vehicle 3a into an unmovable object (as indicated above, a wall or the like) and observes if the passenger is still within the vehicle. In a second procedure, the child generally repeats the first procedure, but leaves the seat belt unfastened 5a. The child notes the results of propelling the vehicle 3a containing the unsecured passenger figure into a stationary object. Since the FIG. 20 is flexibly jointed, after the collision, positional changes in the joints are observed and conclusions may be drawn concerning human occupants in an actual life-size vehicle.

EXAMPLE 2

An experiment similar to Example 1 above is conducted, however here a vehicle ramp 35 is employed to lift the vehicle into the air before the crash into the unmovable object. Once again, the results to a seat belt secured and seat belt unsecured passenger FIG. 20 are noted.

EXAMPLE 3

As in the first two Examples, a comparison is made between two vehicle crashes for the condition of a post-crash passenger figure 20; one vehicle crash in which the figure is seat belt secured and the other vehicle crash where the figure is not seat belt secured. Here, in place of the unmovable object a partially movable crash object 40 is employed. The child user can see if a vehicle crashed into a partially movable object 40 results, as compared to an unmovable object crash, in a less distorted passenger FIG. 20 or one with equal damage. Optionally, to increase the crash variables, a ramp may be used in this exercise.

EXAMPLE 4

Any one or all of the above three land vehicle 3a Examples are repeated, but in each case the exercise is conducted with and without the presence of a vehicle roll bar 30. Should the vehicle 3a tumble or flip up-side-down, the damage results to the passenger FIG. 20. may vary depending upon the presence or absence of the roll bar 30.

EXAMPLE 5

An air vehicle (airplane 3b) having a cockpit seat 10 and fastenable seat belt (specifically in FIG. 5, the seat belt 5a is in an unfastened state) is used. A flexibly jointed pilot FIG. 20 is inserted into the seat 10 (approximately along the dashed lines shown in FIG. 5). After one or a variety of vehicle maneuvers (such as directly crashing the airplane, a bumpy landing, up-side-down flight, and the like), a comparison is made between the "state" of a seat belt fastened and unfastened pilot. The "state" of the pilot refers to if the pilot is still within the airplane or if not, the location of the pilot or the condition of the pilot's joints. Other obvious extensions of this and the above Examples are considered to be within the scope of this disclosure.

Additional visual or physical instructional elements that may enhance the learning experience are optionally included with the subject apparatus. Such instructional elements include, but are not limited to, safety badges, safety arm bands, crash helmets, safety stickers, and the like.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. An instructional toy for teaching vehicle seat belt safety to a child comprising:
   a) a three-dimensional human shaped passenger figure;
   b) a movable three-dimensional land or air vehicle having a passenger seat fitted with a seat belt restraining device, wherein said passenger figure fits in said passenger seat and said seat belt is reversibly securable about said passenger figure, whereby when said seat belt is secured about said passenger figure said passenger figure is restrained from a vehicle crash related removal from said passenger seat; and
   c) an instructional manual that presents safety exercises for said child that illustrate the use of said seat belt and the results to said passenger figure of not securing said seat belt.

2. An instructional child's toy according to claim 1, wherein said seat belt includes a shoulder strap.

3. An instructional child's toy according to claim 1, wherein said passenger figure is flexibly jointed at a plurality of locations to illustrate that after a crash of said vehicle a distortion to said passenger figure results upon being ejected from said vehicle when said passenger figure is not secured by said seat belt.

4. An instructional child's toy according to claim 1, further comprising a partially movable barrier object into which said vehicle is propelled to illustrate seat belt safety.

5. An instructional child's toy according to claim 1, wherein said vehicle is an air vehicle.

6. An instructional child's toy according to claim 1, wherein said vehicle is a land vehicle that usually travels over a supporting surface.

7. An instructional child's toy according to claim 6, further comprising a detachable roll bar for fitting to said vehicle to protect said secured passenger figure in an up-side-down vehicle.

8. An instructional child's toy according to claim 6, further comprising a vehicle ramp for illustrating the results to said passenger figure of propelling said vehicle up and off said ramp when said passenger figure is seat belt secured and not secured.

9. A method of teaching a child seat belt usage in a land or air vehicle, comprising the steps of:
   a) supplying said child with a three-dimensional human shaped passenger figure;
   b) providing said child with a movable three-dimensional vehicle having a passenger seat fitted with a seat belt restraining device, wherein said passenger figure fits in said passenger seat and said seat belt is reversibly securable about said passenger figure, whereby when said seat belt is secured about said passenger figure said passenger figure is restrained from a vehicle crash related removal from said passenger seat; and
   c) equipping said child with an instructional manual that presents safety exercises for said child that illustrate the use of said seat belt and the results to said passenger figure of not securing said seat belt.

10. A method according to claim 9, wherein said passenger figure is flexibly jointed at a plurality of locations to illustrate that after a crash of said vehicle a distortion to said passenger figure results upon being ejected from said vehicle when said passenger figure is not secured by said seat belt.

11. A method according to claim 9, further comprising the step of propelling said vehicle into a partially movable barrier object to illustrate seat belt safety.

* * * * *

REEXAMINATION CERTIFICATE (2678th)

United States Patent [19]
Gladish

[11] B1 5,100,327
[45] Certificate Issued Sep. 19, 1995

[54] METHOD AND APPARATUS FOR TEACHING VEHICLE SAFETY

[76] Inventor: William C. Gladish, 3506 Latana Way, Beale AFB, Calif. 95903

Reexamination Request:
No. 90/003,142, Jul. 26, 1993

Reexamination Certificate for:
Patent No.: 5,100,327
Issued: Mar. 31, 1992
Appl. No.: 636,210
Filed: Dec. 31, 1990

[51] Int. Cl.⁶ ............................................. G09B 25/00
[52] U.S. Cl. ................................. 434/305; 280/801.1
[58] Field of Search ............. 434/267, 274, 305, 365; 446/462, 279, 484, 268; 280/801.1, 808; 273/272

[56] References Cited
U.S. PATENT DOCUMENTS 4,488,375 12/1984 Cheng .
4,575,355  3/1986 Lee .
4,580,985  4/1986 Redenbaugh .

OTHER PUBLICATIONS

Barbie Car Assembly Drawings (and photographs of doll using the car).
Iowa Dept. of Transportation Reference "Ready, Click, Go".
Wayne Wally, Seatbelt Dummies Wise Up, Advertising Age, Jan. 2, 1989, at 8.
Barbie Turns 25, U.P.I., Feb. 14, 1984, available in Lexis, Nexis library, U.P.I. file.
Untitled article concerning Iowa DOT, U.P.I., Aug. 29, 1989, available in Lexis, Nexis library, U.P.I. file.
Health Edco Catalog, product entitled Crash Kramer.
Noll, F.; "Traffic Safety Guides for Teachers Grades 4,5,6"; 1962–1963; AAA.
Noll, F.; "Traffic Safety Guides Grades 4–6"; 1963–1964, Connecticut AAA.
Walker, L.; "Traffic Safety Guides Grades K–3"; 1964–1965, Local AAA.
"Traffic Safety Guides Grades 4–6"; 1965–1966; Virginia AAA.
Stevens, R.; "Traffic Safety Guides—Junior High"; 1964–1965; AAA.
Walker, L.; Crabtree, M.; "Traffic Safety Guides—Grades K–3"; 1965–1966, Virginia AAA.
Stevens, R.; "Traffic Safety Guides—Junior High"; 1965–1966; Virginia AAA.
Crabtree, M; Walker, L.; "Traffic Safety Guides—Grades K–3"; 1967–1968.
Glassman, J.; "Traffic Safety Guides—Junior High"; 1967–1968; AAA.
Glassman, J.; "Traffic Safety Guides—Junior High"; 1969–1970; AAA.
Crabtree, M.; Walker, L.; "Traffic Safety Guides—Grades 4–6"; 1971–1972 AAA.
Glassman, J.; "Traffic Safety Guides—Grades 4–6"; 1972–1973; Pa. AAA.
Glassman, J.; "Traffic Safety Guides—Junior High"; 1972–1973; AAA.
Crabtree M.; Walker, L.; "Traffic Safety Guides—Grades K–3"; 1973–1974, AAA.
Emery, M.; "Traffic Safety Guides—Grades 4–6"; 1974–1975; AAA.
Glassman, J.; "Traffic Safety Guides—Junior High"; 1974–1975; AAA.
Seefeldt, C.; "Traffic Safety Guides—Grades K–3"; 1975–1976; AAA.
Lafond, D.; "Traffic Safety Guides—Grades 4–6"; 1975–1976; AAA.
Glassman, J.; "Traffic Safety Guides—Junior High"; 1975–1976; AAA.
Lafond, D.; "Traffic Safety Guides—Grades 4–6"; 1976–1977; AAA.

(List continued on next page.)

[57] ABSTRACT

For aiding in educating children concerning vehicle safety, an instructional toy vehicle and method of use are disclosed. The toy vehicle is equipped with a functioning shoulder strap seat belt. Included is a crash dummy and instructional manual describing safety exercises that illustrate the use of a seat belt and the results of not wearing such a restraining device.

OTHER PUBLICATIONS

LaFond, D.; "Traffic Safety Guides—Junior High"; 1982–1983; AAA.
Weiss, R.; Weekes, G.; "My Own Safety Story—Grades K–3"; 1983–1984; AAA.
Lafond, D.; "Traffic Safety Guides—Junior High"; 1983–1984; AAA.
Berman, M.; Shevitz, L.; "Traffic Safety Teacher's Guide Grades 4–6"; 1984–1985; AAA.
LaFond, D.; "Traffic Safety Guides—Junior High"; 1984–1985; AAA.
Weiss, R.; Weekes, G.; "Traffic Safety Teacher's Guide—Grades 4–6"; 1985–1986; AAA.
Lafond, D.; "Traffic Safety Guides—Junior High"; 1985–1986; AAA.
Weiss, R.; Weekes, G; Berman, M.; Shevitz, L.; "Traffic Safety Teacher's Guide Grades 4–6"; 1986–1987; AAA.
LaFond, D.; Weekes, G.; Weiss, R.; "Traffic Safety Teacher's Guide Junior High"; 1986–1987; AAA.
Hetherington, B.; Weiss, R.; Weekes, G.; "Traffic Safety Teacher's Guide—Grades 4–6"; 1987–1988; AAA.
Lafond, D.; Weeks, G.; Weiss, R.; "Traffic Safety Teachers Guide Junior High"; 1987–1988; AAA.
Veach, D.; "Traffic Safety Guides—Grades K–3"; 1977–1978; AAA.
Johnson, D.; "Traffic Safety Guides—Grades 4–6"; 1977–1978; AAA.
Ross, S.; "Traffic Safety Guides—Grades K–3"; 1979–1980; AAA.
Lafond, D.; "Traffic Safety Guides—Junior High"; 1979–1980; AAA.
Weiss, R.; "Traffic Safety Guides—Grades K–3"; 1982–1983; AAA.
LaFond, D.; Weekers, G.; "Traffic Safety Teacher's Guide Junior High"; 1988–1989; AAA.
Hetherington, B.; Weekes, G.; "Traffic Safety Teacher's Guide Grades 4–6"; 1988–1989 ; AAA.
Cramer, K.; "Otto The Auto Grades K–3"; 1989–1990; AAA.
Hetherington, B.; Weekes, G.; "Traffic Safety Teachers' Guide Grades 4–6"; 1989–1990; AAA.
LaFond, D.; Weekes, G.; "Traffic Safety Teacher's Guide Junior High"; 1989–1990; AAA.
Jolly, K.; "Children & Traffic"; 1977; Maccillian Education.
"Crash Kramer Instructions"; 1986; Health Ed Co, Waco, Tex.
"Safety Belt, Learning About Safety Belts".

*Primary Examiner*—R. J. Apley

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 6, 10 and 11 are cancelled.

Claims 1, 7, 8 and 9 are determined to be patentable as amended.

Claims 4 and 5, dependent on an amended claim, are determined to be patentable.

1. An instructional toy for teaching vehicle seat belt safety to a child comprising:
   a) a three-dimensional [human shaped passenger figure] *flexible crash dummy;*
   b) *a plurality of movable joints serving as flexible connection points between body members in said crash dummy, wherein after a crash of a vehicle containing said crash dummy a damaging distortion of said movable joints results upon said crash dummy being thrown from said vehicle when said crash dummy is not wearing a seat belt;*
   [b]*c*) a movable three-dimensional land or air vehicle having a passenger seat fitted with a *shoulder strap containing* seat belt restraining device, wherein said [passenger figure] *crash dummy* fits in said passenger seat and said *shoulder strap containing* seat belt is reversibly securable about said [passenger figure], *crash dummy* whereby when said *shoulder strap containing* seat belt is secured about said [passenger figure] *crash dummy* said [passenger figure] *crash dummy* is restrained from a vehicle crash related removal from said passenger seat; and
   [c]*d*) an instructional manual that presents safety exercises for said child that illustrate the use of said *shoulder strap containing* seat belt and the results to said [passenger figure] *crash dummy* of not securing said *shoulder strap containing* seat belt.

7. An instructional child's toy according to claim [6] *1*, further comprising a detachable roll bar for fitting to said vehicle to protect said secured [passenger figure] *crash dummy* in an up-side down vehicle.

8. An instructional child's toy according to claim [6] *1* further comprising a vehicle ramp for illustrating the results to said said passenger figure of propelling said vehicle up and off said ramp when said passenger figure is not secured by said seat belt.

9. A method of teaching a child seat belt usage in a land or air vehicle, comprising the steps of:
   a) supplying said child with a three-dimensional [human shaped passenger figure] *flexible crash dummy having a plurality of movable joints serving as flexible connection points between body members in said crash dummy, wherein after a crash of a vehicle containing said crash dummy a damaging distortion of said movable joints results upon said crash dummy being thrown from said vehicle when said crash dummy is not wearing a seat belt;*
   b) providing said child with a movable three-dimensional *land or air* vehicle having a passenger seat fitted with a *shoulder strap containing* seat belt restraining device, wherein said [passenger figure] *crash dummy* fits in said passenger seat and said *shoulder strap containing* seat belt is reversibly securable about said [passenger figure] *crash dummy*, whereby when said *shoulder strap containing* belt is secured about said [passenger figure] *crash dummy* said [passenger figure] *crash dummy* is restrained from a vehicle crash related removal from said passenger seat; and
   c) equipping said child with an instructional manual that presents safety exercises for said child that illustrate the use of said *shoulder strap containing* seat belt and the results *in positional changes* to said [passenger figure] *crash dummy's movable joints* of not securing said *shoulder strap containing* seat belt.

* * * * *